July 20, 1937.  A. MATTHEWS  2,087,775
FABRIC CLEANING SYSTEM
Filed May 23, 1935
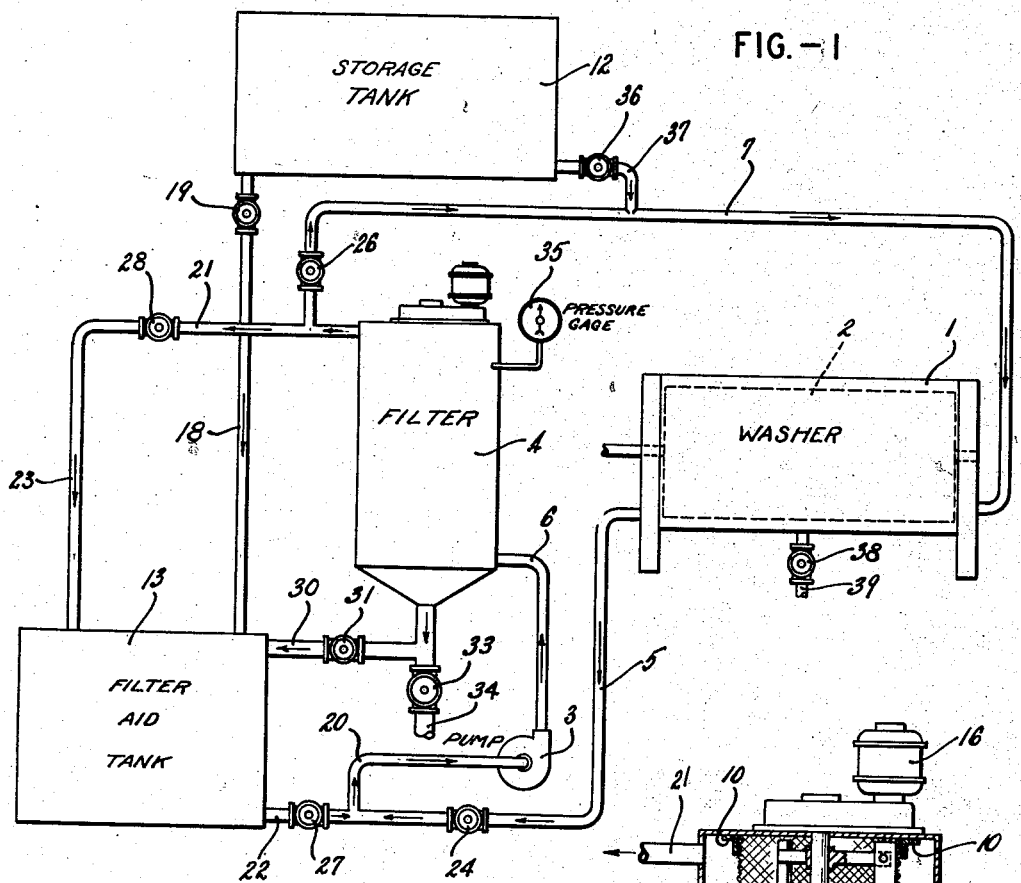
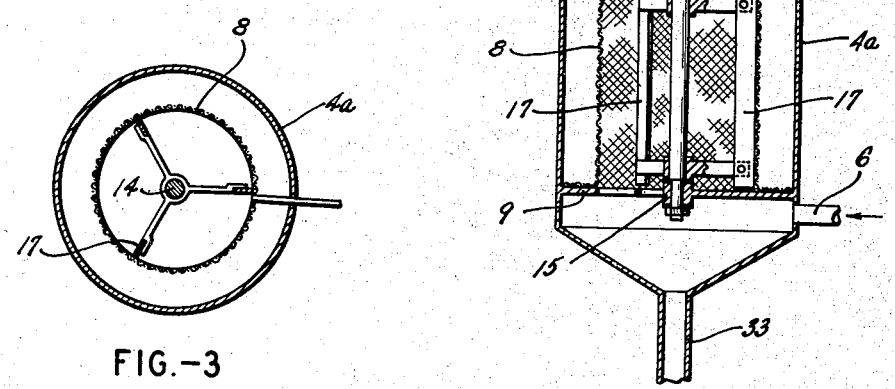
INVENTOR
ALBERT MATTHEWS
BY
Brockett, Hyde, Higley + Meyer
ATTORNEYS Patented July 20, 1937

2,087,775

UNITED STATES PATENT OFFICE 2,087,775

FABRIC CLEANING SYSTEM

Albert Matthews, Cincinnati, Ohio, assignor to The American Laundry Machinery Company, Norwood, Ohio, a corporation of Ohio Application May 23, 1935, Serial No. 23,062

4 Claims. (Cl. 210—150)

My invention relates to fabric cleaning systems including means for filtering the liquid or solvent and returning it for reuse in the cleaning operation. More particularly, it relates to an auxiliary circuit in combination with a cleaning system for depositing a layer of filter aid upon a filtering screen in the main circuit.

In fabric cleaning systems it is desirable after the fabric has been treated with a washing solution or solvent for a predetermined period of time to withdraw a portion of the solvent, filter it, and return it for reuse in the washing operation. In accordance with my invention I have provided an auxiliary circuit by means of which filter aid may be built upon a filtering screen in the main circuit without introducing the filter aid in the fabric treating vessel or in the used solvent which has been drained therefrom.

It is therefore an object of my invention to provide an improved fabric cleaning system, including an auxiliary circuit, by means of which a layer of filter aid may be uniformly deposited upon a filtering screen in the main circuit without mixing the filter aid with the washing fluid or solvent in the treating vessel or with the used solvent.

Another object of my invention is to provide an improved system by means of which filter aid may be deposited upon a filter screen, the used solvent filtered and the filter solids removed from the screen without removing the screen from the system.

A further object of my invention is to provide an improved process for clarifying liquids by means of which soiled solvent may be filtered and returned to the treating vessel and, at desired intervals, the filtered solids may be removed from the screen and a fresh supply of filter aid deposited thereon without removing the screen from the system.

My invention will be better understood by reference to the accompanying drawing in which Fig. 1 is a diagrammatic view of my improved cleaning system; Fig. 2 is a cross-sectional view of the filter; and Fig. 3 is a cross-sectional view on line 3—3 of Fig. 2.

As illustrated in the drawing, my improved system comprises a washer or treating vessel 1, provided with the usual rotatable goods container 2, a pump 3, a filter unit 4, conduits 5 and 6 for conveying the used liquid to the filter, and a conduit 7 for returning the clarified liquid to the washer or treating vessel.

In accordance with my invention I have provided an improved means for depositing a layer of filter aid upon a screen in the filter unit. As illustrated in Figs. 2 and 3 of the drawing, the filter unit comprises an outer casing 4a and a filtering screen 8 spaced inwardly from the wall of the casing. The screen 8 may be supported in the casing 4 in any suitable manner. As illustrated in the drawing, the filter screen is supported on an annular flange 9 extending inwardly from the casing and is attached at its upper end to an angle iron 10 which may be soldered or welded to the upper portion of the receptacle. The filter screen 8 may be formed of nickel, Monel metal, or any suitable metal or alloy which is capable of resisting the corrosive action of the solvent or treating liquid.

Before passing the soiled liquid or solvent through the filter it is desirable, however, to coat the filter screen with a uniform layer of filter aid so that the grease and dirt present in the solvent will not pass through the screen. In accordance with my invention, this may be effected in a simple and very effective manner without introducing the filter aid in the treating solvent by utilizing an auxiliary circuit comprising a storage tank 12 and a tank 13 containing filter aid. The filter aid may be composed of finely divided cellular silica, such as diatomaceous or fuller's earth or, if desired, the cellular silica may be admixed with finely divided carbon or vegetable charcoal.

After the soiled or used solvent has been passed through the filter for a predetermined period of time, I have also provided means for removing the deposited solids from the filter. As shown in Figs. 2 and 3 in the drawing, this means comprises a shaft 14 supported in its lower portion in a bearing 15 which is attached to the casing. The shaft 14 may be rotated by means of a motor 16 and is provided with outwardly extending scrapers for removing the filtered solids from the screen.

The operation of my improved system will now be apparent. A predetermined amount of liquid from a storage tank 12 is passed through the conduit 18, which is controlled by a valve 19, to a tank 13 containing filter aid. If desired, the tank 13 may be provided with an agitating device for maintaining the filter aid in suspension. The liquid from the filter aid tank containing the filter aid in suspension is then forced through conduits 22, 20 and 6 through the filter screen 8 and returned by conduits 21 and 23 to the filter aid tank 13. During the passage of the liquid containing the filter aid through the screen 8, valve 24 controlling conduit 5 and valve 26 controlling conduit 7 are closed, and valves 27 and 28 controlling conduits 22 and 21, respectively, are open. The liquid containing the filter aid is circulated through the auxiliary circuit until a uniform layer of the filter aid is deposited upon the screen 8. Valves 27 and 28 are then closed and any liquid remaining in the filter tank may be drained back into the filter aid tank through the conduit 30, which is controlled by valve 31.

Valves 24 and 26 are then opened and soiled liquid or solvent from the washer 1 is forced through conduits 5, 20 and 6 through the filter aid and returned to the washer by means of conduit 7. When filter solids have been deposited upon the screen in amounts which render further filtration of the liquid through the filter screen impractical, valves 24 and 26 are closed and the scrapers 17 are rotated by motor 16 to remove the filter solids from the screen. The filter solids, together with the solution which is present in the filtering tank, may then be drained from the filter through the conduit 34 which is controlled by a valve 33. Valves 27 and 28 are then opened and a fresh supply of filter aid is deposited upon the screen.

A pressure gage 35 may be provided to indicate the amount of pressure required to force the liquid through the filter. A conduit 37 controlled by a valve 36 extends from the storage tank 12 to the washer 1 through which solvent or cleaning fluid may be introduced into washer 1. A pipe 39 controlled by valve 38 is also provided for draining the used liquid or solvent from the washer.

From the foregoing specification it will be apparent that I have provided an improved system by means of which a filter aid may be uniformly deposited upon a filter screen without mixing the filter aid with the solvent in the washer or the used solvent. When liquid is passed from the washer through the filter screen the solids may accordingly be immediately filtered from the solvent, whereas when the filter aid is mixed with the solvent in the washer or in the soiled solvent, some of the solids are passed through the filter at the beginning of the process and are returned to the washer.

By providing an auxiliary apparatus for depositing filter aid upon the filter screen it will also be seen that the filter aid may be deposited upon the screen either during the preliminary washing operation or while the clothes are being removed from the washer. The soiled liquid may then be circulated through the filter and the clarified solvent returned to the washer. While the clothes are being removed from the washer the filter solids may be removed from the filter screen and a new supply of filter aid deposited in a thin, uniform layer upon the screen.

It will also be seen that I have provided improved means for removing the filter solids from the filtering screen and building up a new layer of the filter aid without removing the filter screen from the system. A simple, convenient method is thus provided whereby the filtering and return of the clarified liquid to the treating vessel may be facilitated.

By providing an auxiliary circuit it will also be seen that it is not necessary to utilize the same liquid for depositing the filter aid upon the screen as that employed in the washing operation, as means are provided for draining this liquid from the filter before the solvent from the washer is passed through the filter. When the same liquid is utilized in depositing the filter aid upon the filter screen as that employed in the washing operation, it may be returned to the filter aid tank, or, if desired, may be employed to supplement the treating liquid or solvent.

To those skilled in the art many modifications and different embodiments of my invention will suggest themselves without departing from the spirit and scope thereof. My improved filter and the description herein are merely illustrative and are not to be in any sense limiting.

What I claim is:

1. In a fabric cleaning system, a treating vessel, a filter unit including a casing having a filter element supported therein, a filter aid tank arranged below the filter unit, conduit means for connecting the filter aid tank in circuit with said filter unit, conduit means for connecting the treating vessel in circuit with said filter unit, conduit means connected to the bottom of said filter unit and extending to the filter aid tank through which all liquid containing filter aid in suspension may be drained from the filter unit into the filter aid tank, and liquid moving means for forcing liquid from the filter aid tank through the filter unit to deposit filter aid upon the filter element and to return the liquid to the filter aid tank and for forcing liquid from the treating vessel through the filter unit and returning the clarified liquor to the treating vessel.

2. In a fabric cleaning system, a treating vessel, a filter unit including a casing having a filter element supported therein, a filter aid tank arranged below the filter unit, conduit means for connecting the filter aid tank in circuit with said filter unit, conduit means for connecting the treating vessel in circuit with said filter unit, conduit means having an inlet connected to the bottom of the filter unit and extending to the filter aid tank through which all liquid containing filter aid in suspension may be drained from the filter unit into the filter aid tank, and pump means for forcing liquid from the filter aid tank through the filter unit to deposit filter aid upon the filter element and for returning the liquid to the filter aid tank, said pumping means also serving to force liquid from the treating vessel through the filter unit and to return the clarified liquid to the treating vessel.

3. In a fabric cleaning system, a treating vessel, a filter unit including a casing having a filter element supported therein, a storage tank, a filter aid tank, conduit means for connecting the filter unit in circuit with the filter aid tank, conduit means for connecting the treating vessel in circuit with the filter unit, conduit means having an inlet connected to the bottom of the filter unit and an outlet communicating with the filter aid tank through which all liquid containing filter aid in suspension may be drained from the filter unit into the filter aid tank, communicating means between the storage tank and the filter aid tank, communicating means between the storage tank and the treating vessel, and pump means for forcing liquid from the filter aid tank through the filter unit and returning it to the filter aid tank, said pump means also serving to force liquid from the treating vessel through the filter unit and to return the clarified liquid to the treating vessel.

4. In a fabric cleaning system, a treating vessel, a filter unit including a casing having a filter element supported therein, a filter aid tank, conduit means for connecting the filter aid tank in circuit with said filter unit, conduit means for connecting the treating vessel in circuit with said filter unit, means providing flow of all liquid containing filter aid in suspension from the filter unit into the filter aid tank, and liquid moving means for forcing liquid from the filter aid tank through the filter unit to deposit filter aid upon the filter element and to return the liquid to the filter aid tank and for forcing liquid from the treating vessel through the filter unit and returning the clarified liquid to the treating vessel.

ALBERT MATTHEWS.